US012806952B2

(12) United States Patent
Kim et al.

(10) Patent No.: US 12,806,952 B2
(45) Date of Patent: Nov. 24, 2026

(54) MOUNT CONTROL SYSTEM AND METHOD FOR VEHICLES

(71) Applicants: HYUNDAI MOTOR COMPANY, Seoul (KR); KIA CORPORATION, Seoul (KR)

(72) Inventors: Jin Hyun Kim, Hwaseong-si (KR); Jang Ho Kim, Yongin-si (KR); Dong Wook Lee, Hwaseong-si (KR); Hyung Jin Kim, Seoul (KR); Eun Suk Yoo, Seoul (KR); Jong Hoon Choi, Suwon-si (KR); Sang Hyun Park, Seoul (KR); Seong Eun Hong, Yongin-si (KR); Young Jae Kim, Yongin-si (KR); Hyeon Jun Kim, Hwaseong-si (KR); In Yong Jung, Incheon (KR); Chang Beom Kim, Cheonan-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 51 days.

(21) Appl. No.: 18/409,468

(22) Filed: Jan. 10, 2024

(65) Prior Publication Data

US 2025/0100340 A1 Mar. 27, 2025

(30) Foreign Application Priority Data

Sep. 27, 2023 (KR) ........................ 10-2023-0129975

(51) Int. Cl.
*B60G 17/019* (2006.01)
*B60G 17/0165* (2006.01)

(52) U.S. Cl.
CPC .... *B60G 17/0165* (2013.01); *B60G 2400/208* (2013.01); *B60G 2401/142* (2013.01)

(58) Field of Classification Search
CPC ............ B60G 17/0195; B60G 17/0165; B60G 2500/30; B60G 2202/413; B60G 2400/208; B60G 2401/142; B60W 10/22
See application file for complete search history.

(56) References Cited

U.S. PATENT DOCUMENTS

| | | | | |
|---|---|---|---|---|
| 8,990,000 | B2 * | 3/2015 | Rhode .................... | B60G 17/06 701/124 |
| 10,377,371 | B2 * | 8/2019 | Anderson .............. | B60G 17/02 |
| 11,180,134 | B2 * | 11/2021 | Yu ........................ | B60G 17/016 |
| 11,613,152 | B2 * | 3/2023 | Toyohira .............. | B60G 17/016 280/5.5 |
| 12,179,539 | B2 * | 12/2024 | Anderson ............ | B60G 17/015 |

* cited by examiner

*Primary Examiner* — Gonzalo Laguarda
(74) *Attorney, Agent, or Firm* — MCDONNELL BOEHNEN HULBERT & BERGHOFF LLP

(57) ABSTRACT

Disclosed are a mount control system and method for vehicles in which a camera of an electronically controlled suspension system with road preview photographs a road surface condition of a road ahead of a vehicle, a suspension controller determines a road surface state of the road based on photographed information of the camera, and a mount controller controls semi-active mounts to be in an on state or in an off state based on road surface state determination information transmitted from the suspension controller and values detected by wheel acceleration sensors mounted on wheels of the vehicle, so as to improve not only NVH performance but also driving vibration damping performance depending on the road surface state.

11 Claims, 9 Drawing Sheets

MOUNT CONTROL SYSTEM AND METHOD FOR VEHICLES

CROSS REFERENCE TO RELATED APPLICATIONS

This application claims under 35 U.S.C. § 119(a) the benefit of priority to Korean Patent Application No. 10-2023-0129975 filed on Sep. 27, 2023, the entire contents of which are incorporated herein by reference.

BACKGROUND

(a) Technical Field

The present disclosure relates to a mount control system and method for vehicles. More particularly, it relates to a mount control system and method for vehicles which may improve driving vibration through damping control of mounts using the configuration of an electronically controlled suspension system with road preview.

(b) Background Art

An electronically controlled suspension system with road preview refers to a system which detects the road surface condition of a road ahead of a vehicle during driving of the vehicle, and performs damping control of suspensions depending on the detected road surface condition.

For this purpose, the electronically controlled suspension system with road preview includes a camera mounted on the front part (the inner upper end of a windshield) of the vehicle, a suspension controller configured to determine a road surface state of the road based on photographed information of the camera, and the suspensions configured such that damping thereof is controlled depending on the road surface state determined by the suspension controller.

Therefore, the shock depending on the road surface state may be damped without being transmitted to passengers in the vehicle by detecting, by the camera, the road surface condition of the road ahead of the vehicle, such as potholes, bumps, and road surface roughness on the road, during driving of the vehicle, determining, by the suspension controller, the road surface state of the road based on the photographed information of the camera, and performing independent damping control of the suspensions of respective wheels depending on the determined road surface state.

A powertrain including an engine and a transmission of the vehicle is supported by a plurality of mounts so as to be mounted on a vehicle body, and a driving motor for electric vehicles is supported by a plurality of mounts, which distribute a load and have controllable behavior, so as to be mounted on a vehicle body.

Semi-active mounts, which are hydraulic mounts having adjustable dynamic characteristics, are used as the mounts.

For this purpose, the semi-active mount includes an actuator configured to open and close a bypass flow path for a fluid, and the actuator may be controlled to be turned on or off by a mount controller.

In this case, turning-on of the semi-active mount indicates turning-on of the actuator of the semi-active mount, and turning-off of the semi-active mount indicates turning-off of the actuator of the semi-active mount.

Therefore, the dynamic characteristics of the semi-active mount may be adjusted by turning on or off the actuator of the semi-active mount by the mount controller.

For example, when the semi-active mount is controlled to be turned on (operated), dynamic stiffness of the mount may be adjusted to less than a designated low level in the full frequency band and thus noise, vibration and harshness performance is improved, i.e., idle vibration and booming noise transmitted to the interior of the vehicle are reduced, but dynamic stiffness and damping force of the mount are adjusted to less than designated levels even in a hopping frequency band which is a main excitation source of road surface vibration and thus a driving vibration damping effect depending on the road surface state is poor, as shown in FIG. 1.

On the other hand, when the semi-active mount is controlled to be turned off (not operated), dynamic stiffness and damping force of the mount are adjusted to equal to or greater than designated levels in the hopping frequency band which is the main excitation source of road surface vibration and thus the driving vibration damping effect is great, but noise, vibration and harshness performance is poor, i.e., the insulation or reduction effect of idle vibration and booming noise is poor, as shown in FIG. 2.

As such, the conventional semi-active mounts have a trade-off between driving vibration damping performance and NVH performance depending on on or off control.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to solve the above-described problems associated with the prior art, and it is an object of the present disclosure to provide a mount control system and method for vehicles in which a camera of an electronically controlled suspension system with road preview photographs a road surface condition of a road ahead of a vehicle, a suspension controller determines a road surface state of the road based on photographed information of the camera, and a mount controller controls semi-active mounts to be in an on state or in an off state based on road surface state determination information transmitted from the suspension controller and values detected by wheel acceleration sensors mounted on wheels of the vehicle, so as to improve not only NVH performance but also driving vibration damping performance depending on the road surface state.

In one aspect, the present disclosure provides a mount control system for vehicles, including a camera configured to photograph a road surface condition of a road ahead of a vehicle, wheel acceleration sensors mounted on front wheels of the vehicle and configured to detect vertical accelerations acting on the front wheels, a suspension controller configured to determine a road surface state of the road based on photographed information of the camera and values detected by the wheel acceleration sensors, and a mount controller configured to control semi-active mounts to be in an on state or in an off state based on road surface state determination information transmitted from the suspension controller and the values detected by the wheel acceleration sensors.

In a preferred embodiment, the suspension controller may determine the road surface state of the road as one of a general road surface state, a rough road surface state and a bumpy road surface state, and the suspension controller may determine the road surface state of the road as the general road surface state when a road surface roughness value of the road is less than a reference value, and may determine the road surface state of the road as the rough road surface state when the road surface roughness value of the road is equal to or greater than another reference value.

In another preferred embodiment, the suspension controller may determine the road surface state of the road as the bumpy road surface state when there is a bump within a set distance ahead of the vehicle or when the vehicle is passing over a bump.

In still another preferred embodiment, in a situation in which the road surface state of the road transmitted from the suspension controller is determined to be the general road surface state, the mount controller may control the semi-active mounts to enter the off state from the on state, when the value detected by the wheel acceleration sensor mounted on one of the front wheels is equal to or greater than a yet another reference value.

In yet another preferred embodiment, after controlling the semi-active mounts to enter the off state from the on state, the mount controller may control the semi-active mounts to return to the on state from the off state, when the value detected by the wheel acceleration sensor becomes less than the reference value for a first reference time.

In still yet another preferred embodiment, after controlling the semi-active mounts to return to the on state from the off state, the mount controller may control the semi-active mounts to reenter the off state from the on state, when the value detected by the wheel acceleration sensor again becomes equal to or greater than the reference value within a second reference time longer than the first reference time.

In a further preferred embodiment, after controlling the actuators of the semi-active mounts to reenter the off state from the on state, the mount controller may control the semi-active mounts to return again to the on state from the off state, when the value detected by the wheel acceleration sensor becomes less than the reference value for a third reference value longer than the first reference time but shorter than the second reference time.

In another further preferred embodiment, in a case in which the road surface state of the road transmitted from the suspension controller is determined to be the rough road surface state, the mount controller may control the semi-active mounts to enter the off state from the on state, when the value detected by the wheel acceleration sensor mounted on one of the front wheels is equal to or greater than a value obtained by multiplying a yet another reference value by a rough road surface weight.

In still another further preferred embodiment, after controlling the semi-active mounts to enter the off state from the on state, the mount controller may control the semi-active mounts to return to the on state from the off state, when the value detected by the wheel acceleration sensor becomes less than the value obtained by multiplying the reference value by the rough road surface weight for a first reference time.

In yet another further preferred embodiment, after controlling the semi-active mounts to return to the on state from the off state, the mount controller may control the semi-active mounts to reenter the off state from the on state, when the value detected by the wheel acceleration sensor again becomes equal to or greater than the value obtained by multiplying the reference value by the rough road surface weight within a second reference time longer than the first reference time.

In still yet another further preferred embodiment, after controlling the actuators of the semi-active mounts to reenter the off state from the on state, the mount controller may control the semi-active mounts to return again to the on state from the off state, when the value detected by the wheel acceleration sensor becomes less than the value obtained by multiplying the reference value by the rough road surface weight for a third reference value longer than the first reference time but shorter than the second reference time.

In a still further preferred embodiment, in a case in which the road surface state of the road transmitted from the suspension controller is determined to be the bumpy road surface state, the mount controller may control the semi-active mounts to enter the off state from the on state, when the value detected by the wheel acceleration sensor mounted on one of the front wheels is equal to or greater than a value obtained by multiplying a yet another reference value by a bump weight.

In a yet still further preferred embodiment, after controlling the semi-active mounts to enter the off state from the on state, the mount controller may control the semi-active mounts to return to the on state from the off state, when the value detected by the wheel acceleration sensor becomes less than the value obtained by multiplying the reference value by the bump weight for a first reference time.

In still another preferred embodiment, after controlling the semi-active mounts to return to the on state from the off state, the mount controller may control the semi-active mounts to reenter the off state from the on state, when the value detected by the wheel acceleration sensor again becomes equal to or greater than the value obtained by multiplying the reference value by the bump weight within a second reference time longer than the first reference time.

In yet another preferred embodiment, after controlling the actuators of the semi-active mounts to reenter the off state from the on state, the mount controller may control the semi-active mounts to return again to the on state from the off state, when the value detected by the wheel acceleration sensor becomes less than the value obtained by multiplying the reference value by the bump weight for a third reference value longer than the first reference time but shorter than the second reference time.

In another aspect, the present disclosure provides a mount control method for vehicles, including photographing, by a camera, a road surface condition of a road ahead of a vehicle, detecting, by wheel acceleration sensors mounted on front wheels of the vehicle, vertical accelerations acting on the front wheels, determining, by a suspension controller, a road surface state of the road based on photographed information of the camera and values detected by the wheel acceleration sensors, and controlling, by a mount controller, semi-active mounts to be in an on state or in an off state based on road surface state determination information transmitted from the suspension controller and the values detected by the wheel acceleration sensors.

In a preferred embodiment, when the road surface state of the road is determined to be one of a general road surface state, a rough road surface state and a bumpy road surface state by the suspension controller, the road surface state of the road may be determined to be the general road surface state when a road surface roughness value of the road is less than a reference value, may be determined to be the rough road surface state when the road surface roughness value of the road is equal to or greater than another reference value, and may be determined to be the bumpy road surface state when there is a bump within a set distance ahead of the vehicle or when the vehicle is passing over a bump.

In another preferred embodiment, in a case in which the road surface state of the road transmitted from the suspension controller is determined to be the general road surface state, the semi-active mounts may be controlled to enter the off state from the on state by the mount controller, when the value detected by the wheel acceleration sensor mounted on one of the front wheels is equal to or greater than a yet another reference value.

In still another preferred embodiment, in a case in which the road surface state of the road transmitted from the suspension controller is determined to be the general road surface state, the semi-active mounts may be controlled to enter the off state from the on state by the mount controller, when the value detected by the wheel acceleration sensor mounted on one of the front wheels is equal to or greater than a value obtained by multiplying a yet another reference value by a rough road surface weight.

In yet another preferred embodiment, in a case in which the road surface state of the road transmitted from the suspension controller is determined to be the general road surface state, the semi-active mounts may be controlled to enter the off state from the on state by the mount controller, when the value detected by the wheel acceleration sensor mounted on one of the front wheels is equal to or greater than a value obtained by multiplying a yet another reference value by a bump weight.

Other aspects and preferred embodiments of the disclosure are discussed infra.

The above and other features of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
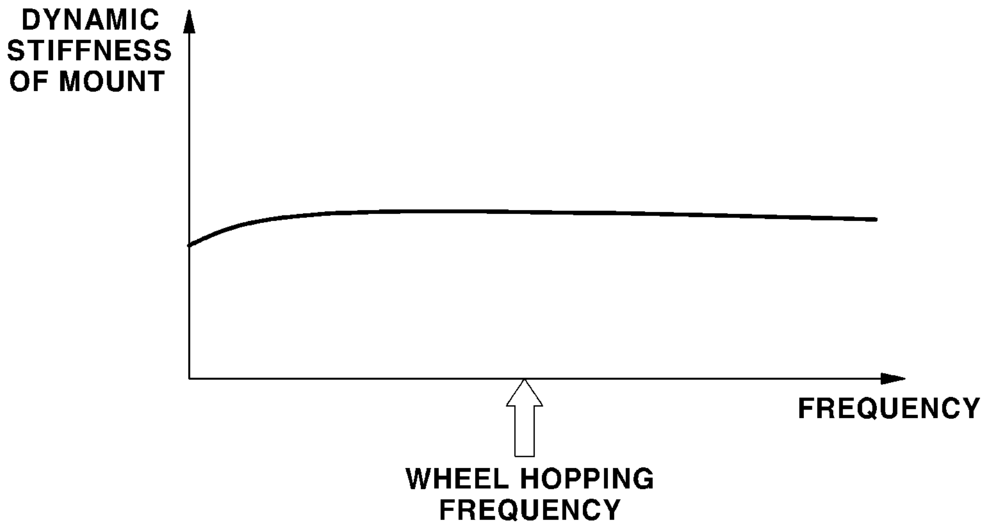
FIG. 1 is a graph representing dynamic stiffness of a semi-active mount in the on state.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Specific structural or functional descriptions in embodiments of the present disclosure set forth in the description which follows will be exemplarily given to describe the embodiments of the present disclosure, and the present disclosure may be embodied in many alternative forms. Further, it will be understood that the present disclosure should not be construed as being limited to the embodiments set forth herein, and the embodiments of the present disclosure are provided only to completely disclose the disclosure and cover modifications, equivalents or alternatives which come within the scope and technical range of the disclosure.

In the following description of the embodiments, terms, such as “first” and “second”, are used only to describe various elements, and these elements should not be construed as being limited by these terms. These terms are used only to distinguish one element from other elements. For example, a first element described hereinafter may be termed a second element, and similarly, a second element described hereinafter may be termed a first element, without departing from the scope of the disclosure.

Hereinafter, exemplary embodiments of the present disclosure will be descried in detail with reference to the accompanying drawings.

Figure 3:
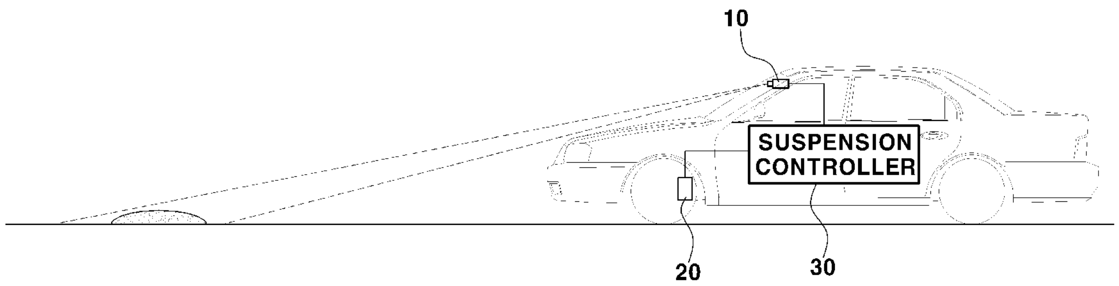
FIG. 3 is a schematic view showing a mount control system for vehicles according to the present disclosure.
Figure 4:
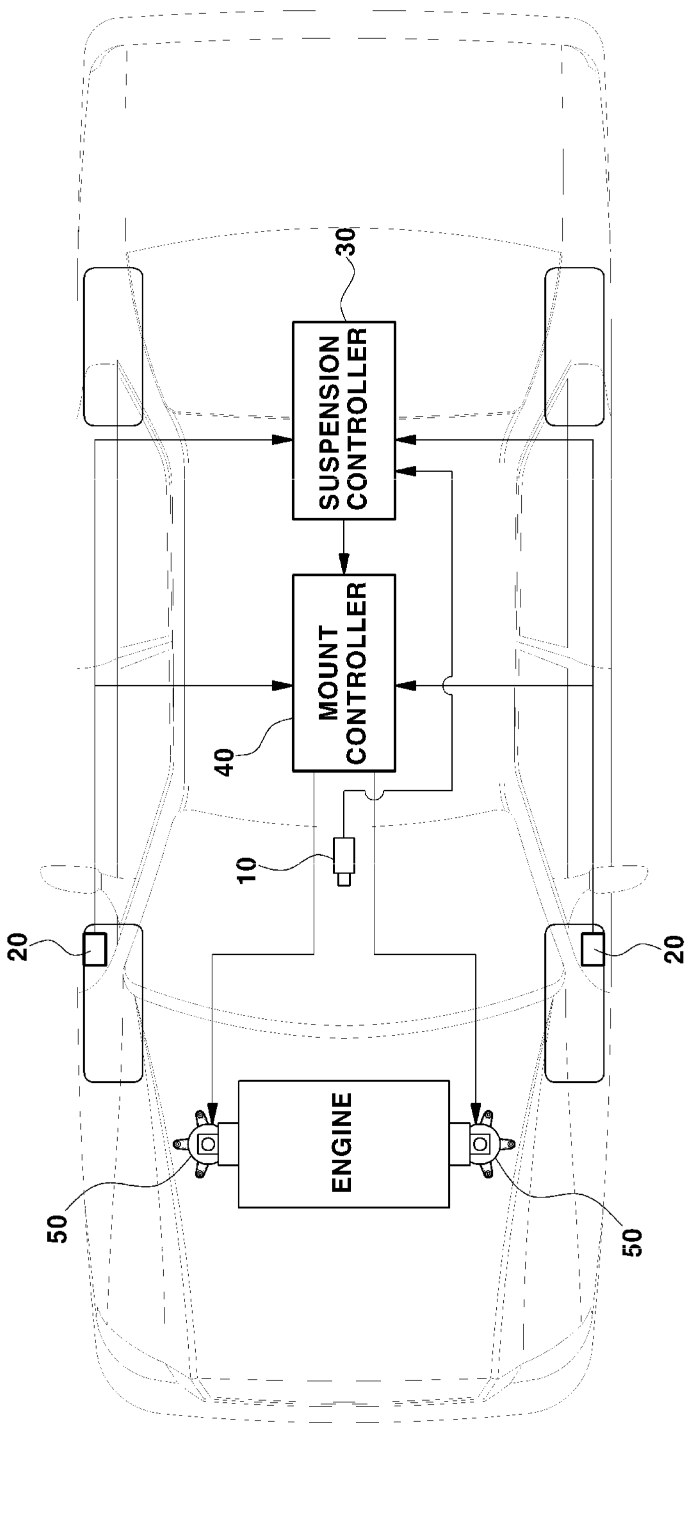
FIG. 4 is a schematic view showing a mount control system for vehicles according to the present disclosure.

FIGS. 3 and 4 are schematic views showing a mount control system for vehicles according to the present disclosure.

Referring to FIG. 3, an electronically controlled suspension system with road preview includes a camera mounted on the front part (the inner upper end of a windshield) of a vehicle, and a suspension controller configured to determine a road surface state of a road based on photographed information of the camera and to perform damping control of suspensions depending on the determined road surface state.

The present disclosure is focused on adjustment of dynamic stiffness of the semi-active mounts and a damping amount of the suspensions with respect to driving vibration depending on the road surface state, through cooperative control between the suspension controller of the electronically controlled suspension system with road preview and a mount controller configured to control the semi-active mounts so as to be turned on or off.

For this purpose, the mount control system for vehicles according to the present disclosure may include, as shown in FIGS. 3 and 4, a camera 10 configured to photograph a road surface condition of a road ahead of a vehicle, wheel acceleration sensors 20 mounted on front wheels of the vehicle or at positions around the front wheels so as to detect vertical accelerations acting on the front wheels, a suspension controller 30 configured to determine a road surface state of the road based on photographed information of the camera 10 and values detected by the wheel acceleration sensors 20, and a mount controller 40 configured to control semi-active mounts 50 so as to be turned on or off based on road surface state determination information transmitted from the suspension controller 30 and the values detected by the wheel acceleration sensors 20.

The suspension controller 30 is configured to determine the road surface state of the road as one of a general road surface state, a rough road surface state, and a bumpy road surface state based on the photographed information of the camera 10 and the values detected by the wheel acceleration sensors 20.

Particularly, the suspension controller 30 determines the road surface state of the road as the general road surface state when a road surface roughness value (RRV) of the road is less than a reference value prvG, and determines the road surface state of the road as the rough road surface state when the road surface roughness value (RRV) of the road is equal to or greater than a reference value prvF.

For example, the road surface roughness value (RRV) may be an index value calculated by integrating the values detected by the wheel acceleration sensors 20, the reference value prvF may be a parameter value to determine the road surface state as the rough road surface state and to activate a rough road surface mode, which may be set to 5, and the reference value prvG may be a parameter value to determine the road surface state as the general road surface state and release of activation of the rough road surface mode, which may be set to 3.

In addition, the values detected by the wheel acceleration sensors 20 are vertical acceleration values acting on the wheels, and increase as road surface roughness is increased and decrease as road surface roughness is decreased, and therefore, the road surface roughness value may be acquired as the index value calculated by integrating the values detected by the wheel acceleration sensors 20.

Further, the suspension controller 30 determines the road surface state of the road as the bumpy road surface state when there is a bump within a set distance (for example, 20 m) ahead of the vehicle or when the vehicle is passing over a bump based on the photographed information of the camera 10.

Particularly, the suspension controller 30 recognizes the road surface state information of the road determined based on the photographed information (i.e., road surface condition photographed information) of the camera 10 as a number. Here, a recognition value of 0 means that the road surface state of the road is the general road surface state, a recognition value of 2 means that there is a bump within 20 m ahead of the vehicle, and a recognition value of 3 means that the vehicle is passing over a bump. The suspension controller 30 may determine that the road surface state of the road is the bumpy road surface state, when the recognition value is equal to or greater than a reference value prvE.

For example, the reference value prvE may a value to determine the road surface state as the bumpy road surface state, which may be set to 2.

Information about the road surface state of the road determined to be one of the general road surface state, the rough road surface state and the bumpy road surface state by the suspension controller 30, as above, is transmitted to the mount controller 40, and is used to perform the on or off control of the semi-active mounts 50.

According to one embodiment, in the case that the road surface state of the road transmitted from the suspension controller 30 is determined to be the general road surface state, the mount controller 40 controls actuators of the semi-active mounts 50 to enter the off state from the on state so as to enter aftershock control (driving vibration damping control), when the value detected by the wheel acceleration sensor 20 mounted on the front left wheel or the front right wheel is equal to or greater than a reference value prvA.

For example, the reference value prvA may be a value to determine whether or not the actuators enter or release driving vibration damping control, which may be set to 1.95 g.

After controlling the actuators of the semi-active mounts 50 to enter the off state from the on state, the mount controller 40 controls the actuators of the semi-active mounts 50 to return to the on state from the off state so as to improve NVH performance, i.e., to reduce idle vibration and booming noise, when the value detected by the wheel acceleration sensor 20 becomes less than the reference value prvA for a first reference time prvB.

For example, the first reference time prvB may be set to 1 second.

Further, after controlling the actuators of the semi-active mounts 50 to return to the on state from the off state, the mount controller 40 controls the actuators of the semi-active mounts 50 to reenter the off state from the on state so as to reenter aftershock control (driving vibration damping control), when the value detected by the wheel acceleration sensor 20 again becomes equal to or greater than the reference value prvA within a second reference time prvC, which is longer than the first reference time prvB.

For example, the second reference time prvC may be set to 6 seconds longer than the first reference time prvB so as to suppress frequent reentry of the actuators of the semi-active mounts 50 to the off state from the on state.

Further, after controlling the actuators of the semi-active mounts 50 to reenter the off state from the on state, the mount controller 40 controls the actuators of the semi-active mounts 50 to return again to the on state from the off state so as to improve NVH performance, i.e., to reduce idle vibration and booming noise, when the value detected by the wheel acceleration sensor 20 becomes less than the reference value prvA for a third reference value prvB+prvD which is longer than the first reference time prvB but shorter than the second reference time prvC.

For example, reentry of the actuators of the semi-active mounts 50 to the off state from the on state is regarded as a situation in which repeated aftershock control is required, and thus, the third reference value prvB+prvD may be set to 3 seconds, which is longer than the first reference time prvB but shorter than the second reference time prvC.

According to another embodiment, in the case that the road surface state of the road transmitted from the suspension controller 30 is determined to be the rough road surface state, the mount controller 40 controls the actuators of the semi-active mounts 50 to enter the off state from the on state so as to enter aftershock control (driving vibration damping control), when the value detected by the wheel acceleration sensor 20 mounted on the front left wheel or the front right wheel is equal to or greater than a value obtained by multiplying the reference value prvA by a rough road surface weight prvH.

For example, the reference value prvA may be the value to determine whether or not the actuators enter or release driving vibration damping control, which may be set to 1.95 g, and the rough road surface weight prvH may be a value to lower the reference value prvA, which may be set to 0.8, so as to more easily perform aftershock control (driving vibration damping control) compared to in the general road surface state.

After controlling the actuators of the semi-active mounts 50 to enter the off state from the on state, the mount controller 40 controls the actuators of the semi-active mounts 50 to return to the on state from the off state so as to improve NVH performance, i.e., to reduce idle vibration and booming noise, when the value detected by the wheel acceleration sensor 20 becomes less than the value obtained by multiplying the reference value prvA by the rough road surface weight prvH for the first reference time prvB.

For example, the first reference time prvB may be set to 1 second.

Further, after controlling the actuators of the semi-active mounts 50 to return to the on state from the off state, the mount controller 40 controls the actuators of the semi-active mounts 50 to reenter the off state from the on state so as to reenter aftershock control (driving vibration damping control), when the value detected by the wheel acceleration sensor 20 again becomes equal to or greater than the value obtained by multiplying the reference value prvA by the rough road surface weight prvH within the second reference time prvC which is longer than the first reference time prvB.

For example, the second reference time prvC may be set to 6 seconds longer than the first reference time prvB so as to suppress frequent reentry of the actuators of the semi-active mounts 50 to the off state from the on state.

Further, after controlling the actuators of the semi-active mounts 50 to reenter the off state from the on state, the mount controller 40 controls the actuators of the semi-active mounts 50 to return again to the on state from the off state so as to improve NVH performance, i.e., to reduce idle vibration and booming noise, when the value detected by the wheel acceleration sensor 20 becomes less than the value obtained by multiplying the reference value prvA by the rough road surface weight prvH for the third reference value prvB+prvD which is longer than the first reference time prvB but shorter than the second reference time prvC.

For example, reentry of the actuators of the semi-active mounts 50 to the off state from the on state is regarded as the situation in which repeated aftershock control is required, and thus, the third reference value prvB+prvD may be set to 3 seconds, which is longer than the first reference time prvB but shorter than the second reference time prvC.

According to yet another embodiment, in the case that the road surface state of the road transmitted from the suspension controller 30 is determined to be the bumpy road surface state, the mount controller 40 controls the actuators of the semi-active mounts 50 to enter the off state from the on state so as to enter aftershock control (driving vibration damping control), when the value detected by the wheel acceleration sensor 20 mounted on the front left wheel or the front right wheel is equal to or greater than a value obtained by multiplying the reference value prvA by a bump weight prvL.

For example, the reference value prvA may be the value to determine whether or not the actuators enter or release driving vibration damping control, which may be set to 1.95 g, and the bump weight prvL may be a value to significantly lower the reference value prvA, which may be set to 0.2, so as to more easily perform aftershock control (driving vibration damping control) compared to in the general road surface state and the rough road surface state.

After controlling the actuators of the semi-active mounts 50 to enter the off state from the on state, the mount controller 40 controls the actuators of the semi-active mounts 50 to return to the on state from the off state so as to improve NVH performance, i.e., to reduce idle vibration and booming noise, when the value detected by the wheel acceleration sensor 20 becomes less than the value obtained by multiplying the reference value prvA by the bump weight prvL for the first reference time prvB.

For example, the first reference time prvB may be set to 1 second.

Further, after controlling the actuators of the semi-active mounts 50 to return to the on state from the off state, the mount controller 40 controls the actuators of the semi-active mounts 50 to reenter the off state from the on state so as to reenter aftershock control (driving vibration damping control), when the value detected by the wheel acceleration sensor 20 again becomes equal to or greater than the value obtained by multiplying the reference value prvA by the bump weight prvL within the second reference time prvC which is longer than the first reference time prvB.

For example, the second reference time prvC may be set to 6 seconds longer than the first reference time prvB so as to suppress frequent reentry of the actuators of the semi-active mounts 50 to the off state from the on state.

Further, after controlling the actuators of the semi-active mounts 50 to reenter the off state from the on state, the mount controller 40 controls the actuators of the semi-active mounts 50 to return again to the on state from the off state so as to improve NVH performance, i.e., to reduce idle vibration and booming noise, when the value detected by the wheel acceleration sensor 20 becomes less than the value obtained by multiplying the reference value prvA by the bump weight prvL for the third reference value prvB+prvD which is longer than the first reference time prvB but shorter than the second reference time prvC.

For example, reentry of the actuators of the semi-active mounts 50 to the off state from the on state is regarded as the situation in which repeated aftershock control is required, and thus, the third reference value prvB+prvD may be set to 3 seconds, which is longer than the first reference time prvB but shorter than the second reference time prvC.

Hereinafter, a mount control method for vehicles according to one embodiment of the present disclosure executed based on the above-described configuration will be described as follows.

Figure 5:
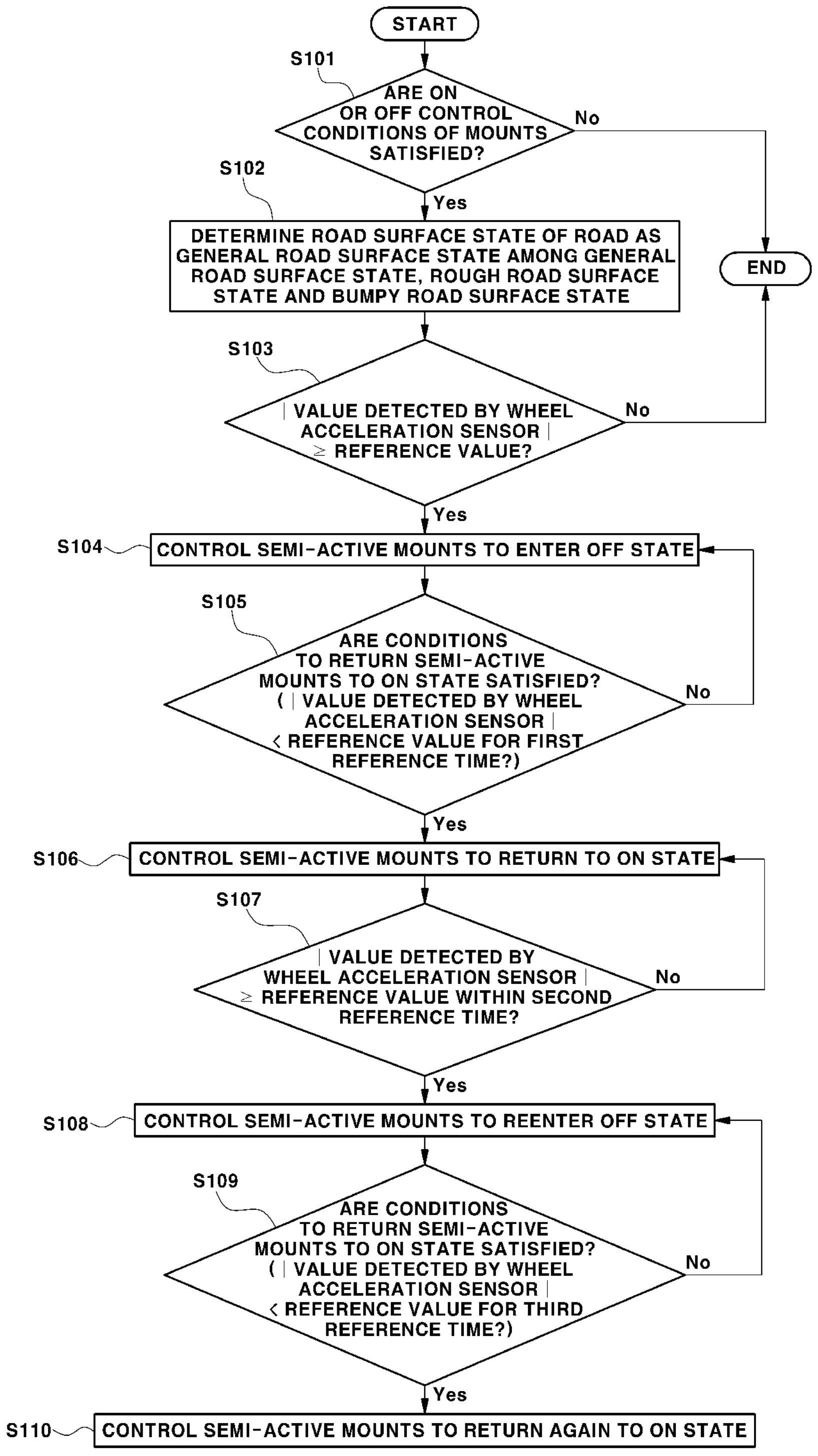
FIG. 5 is a flowchart representing a mount control method for vehicles according to the present disclosure.

FIG. 5 is a flowchart representing the mount control method for vehicles, when the road surface state of a road is determined to be the general road surface state.

First, whether or not on or off control conditions of the semi-active mounts 50 are satisfied during driving of the vehicle is determined (S101).

For example, when the suspension controller 30 and the mount controller 40 receive a signal indicating that the rotational speed of an engine is 1200-1600 RPM from an engine controller and a signal indicating that the depressed amount of an accelerator pedal is 10-90% from an accelerator pedal position sensor in the start-up state of the vehicle, it may be determined that conditions to control the actuators of the semi-active mounts 50 to enter the off state from the on state or the on state from the off state are satisfied.

Therefore, upon determining that the on or off control conditions of the semi-active mounts 50 are satisfied, the camera 10 may photograph a road surface condition of the road ahead of the vehicle, and the wheel acceleration sensors 20 mounted on the front wheels of the vehicle may detect vertical accelerations acting on the front wheels.

Thereafter, the suspension controller 30 may determine the road surface state of the road as the general road surface state, based on photographed information of the camera 10 and values detected by the wheel acceleration sensors 20 (S102).

For example, the suspension controller 30 may determine the road surface state of the road as the general road surface state, when a road surface roughness value (RRV) of the road is less than the reference value prvG based on the values detected by the wheel acceleration sensors 20, and the suspension controller 30 may recognize information about the road surface state of the road determined based on the photographed information of the camera 10 as a number, and may determine the road surface state of the road as the general road surface state, when the recognition value is 0.

Thereafter, in the case that the road surface state of the road transmitted from the suspension controller 30 is determined to be the general road surface state, the mount controller 40 determines whether or not the value detected by the wheel acceleration sensor 20 mounted on the front left wheel or the front right wheel is equal to or greater than the reference value prvA (S103).

As a result of determination, when the value detected by the wheel acceleration sensor 20 is equal to or greater than the reference value prvA, the mount controller 40 controls the actuators of the semi-active mounts 50 to enter the off state from the on state so as to enter aftershock control (driving vibration damping control) (S104).

Concretely, when a vertical acceleration acting on the front wheel, i.e., the value detected by the wheel acceleration sensor 20, is equal to or greater than the reference value prvA, the mount controller 40 determines the road surface state of the road as the general road surface state, but recognizes the road surface as an uneven general road surface causing driving vibration and thus requiring aftershock control (driving vibration damping control), and thus controls the actuators of the semi-active mounts 50 to enter the off state from the on state.

Figure 2:
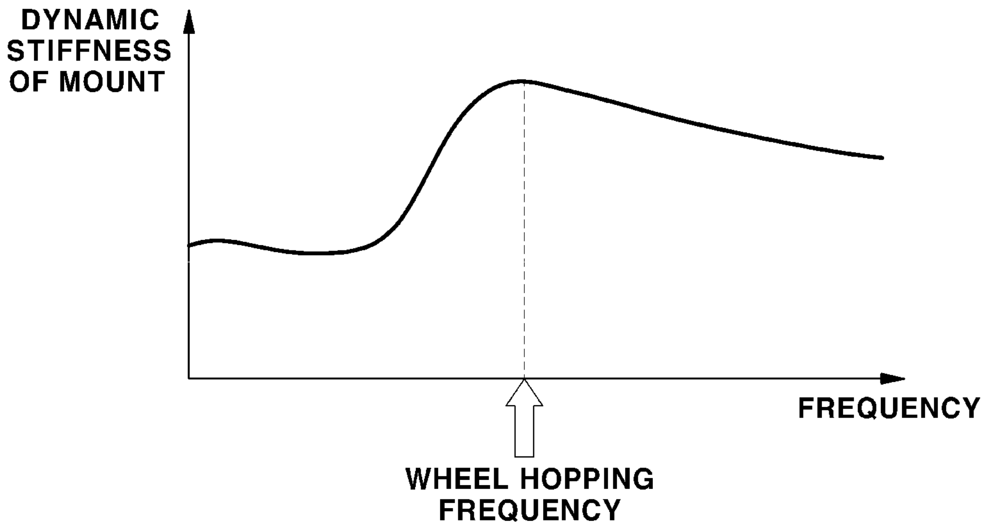
FIG. 2 is a graph representing dynamic stiffness of the semi-active mount in the off state.

When the actuators of the semi-active mounts 50 are controlled to enter the off state, dynamic stiffness and damping force of the semi-active mounts 50 may be adjusted to equal to or greater than the designated levels in the hopping frequency band which is the main excitation source of road surface vibration, as shown in FIG. 2, and thus, driving vibration damping by the semi-active mounts 50 may be achieved.

Thereafter, the mount controller 40 determines whether or not conditions to control the actuators of the semi-active mounts to return to the on state are satisfied (S105).

That is, after controlling the actuators of the semi-active mounts 50 to enter the off state from the on state, the mount controller 40 determines whether or not the value detected by the wheel acceleration sensor 20 becomes less than the reference value prvA for the first reference time prvB.

After controlling the actuators of the semi-active mounts 50 to enter the off state from the on state, when the value detected by the wheel acceleration sensor 20 becomes less than the reference value prvA for the first reference time prvB, the mount controller 40 controls the actuators of the semi-active mounts 50 to return to the on state from the off state (S106).

When the actuators of the semi-active mounts 50 are controlled to return to the on state from the off state, dynamic stiffness of the semi-active mounts 50 may be adjusted to be less than the designated low level in the full frequency band, as shown in FIG. 1, and thus, improvement in NVH performance, such as reduction in idle vibration and booming noise transmitted to the interior of the vehicle, may be achieved.

Thereafter, after controlling the actuators of the semi-active mounts 50 to return to the on state from the off state, the mount controller 40 determines whether or not conditions to control the actuators of the semi-active mounts 50 to reenter the off state from the on state are satisfied within the second reference time prvC.

That is, after controlling the actuators of the semi-active mounts 50 to return to the on state from the off state, the mount controller 40 determines whether or not the value detected by the wheel acceleration sensor 20 again becomes equal to or greater than the reference value prvA within the second reference time prvC which is longer than the first reference time prvB (S107).

After controlling the actuators of the semi-active mounts 50 to return to the on state from the off state, when the value detected by the wheel acceleration sensor 20 again becomes equal to or greater than the reference value prvA within the second reference time prvC which is longer than the first reference time prvB, the mount controller 40 controls the actuators of the semi-active mounts 50 to reenter the off state from the on state (S108).

Here, the second reference time prvC may be set to 6 seconds longer than the first reference time prvB so as to suppress frequent reentry of the actuators of the semi-active mounts 50 to the off state from the on state.

When the actuators of the semi-active mounts 50 are controlled to reenter the off state, dynamic stiffness and damping force of the semi-active mounts 50 may be adjusted to equal to or greater than the designated levels in the hopping frequency band which is the main excitation source of road surface vibration, as shown in FIG. 2, and thus, driving vibration damping by the semi-active mounts 50 may be achieved.

Thereafter, after controlling the actuators of the semi-active mounts 50 to reenter the off state from the on state, the mount controller 40 determines whether or not conditions to control the actuators of the semi-active mounts 50 to return again to the on state from the off state are satisfied.

That is, after controlling the actuators of the semi-active mounts 50 to reenter the off state from the on state, the mount controller 40 determines whether or not the value detected by the wheel acceleration sensor 20 becomes less than the reference value prvA for the third reference value prvB+prvD which is longer than the first reference time prvB but shorter than the second reference time prvC (S109).

After controlling the actuators of the semi-active mounts 50 to reenter the off state from the on state, when the value detected by the wheel acceleration sensor 20 becomes less than the reference value prvA for the third reference value prvB+prvD which is longer than the first reference time prvB but shorter than the second reference time prvC, the mount controller 40 controls the actuators of the semi-active mounts 50 to return again to the on state from the off state (S110).

Here, reentry of the actuators of the semi-active mounts 50 to the off state from the on state is regarded as a situation in which repeated aftershock control is required, and thus, the third reference value prvB+prvD may be set to 3 seconds, which is longer than the first reference time prvB but shorter than the second reference time prvC.

When the actuators of the semi-active mounts 50 are controlled to return again to the on state from the off state, dynamic stiffness of the semi-active mounts 50 may be adjusted to be less than the designated low level in the full frequency band, as shown in FIG. 1, and thus, improvement in NVH performance, such as reduction in idle vibration and booming noise transmitted to the interior of the vehicle, may be achieved.

Hereinafter, a mount control method for vehicles according to another embodiment of the present disclosure executed based on the above-described configuration will be described as follows.

Figure 6:
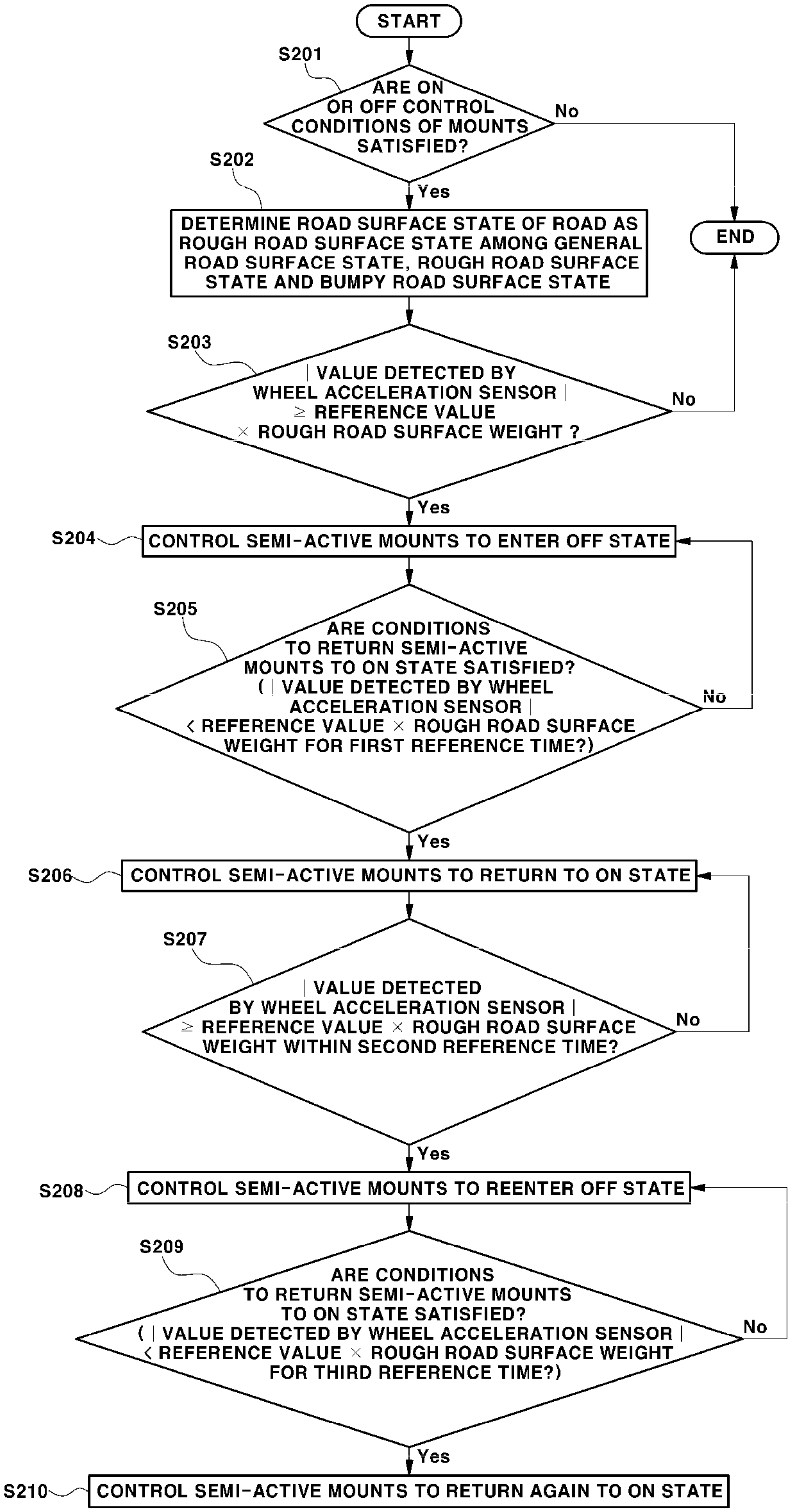
FIG. 6 is a flowchart representing a mount control method for vehicles according to the present disclosure.

FIG. 6 is a flowchart representing the mount control method for vehicles, when the road surface state of a road is determined to be the rough road surface state.

First, whether or not on or off control conditions of the semi-active mounts 50 are satisfied during driving of the vehicle is determined (S201).

For example, when the suspension controller 30 and the mount controller 40 receive the signal indicating that the rotational speed of the engine is 1200-1600 RPM from the engine controller and the signal indicating that the depressed amount of the accelerator pedal is 10-90% from the accelerator pedal position sensor in the start-up state of the vehicle, it may be determined that conditions to control the actuators of the semi-active mounts 50 to enter the off state from the on state or the on state from the off state are satisfied.

Therefore, upon determining that the on or off control conditions of the semi-active mounts 50 are satisfied, the camera 10 may photograph the road surface condition of the road ahead of the vehicle, and the wheel acceleration sensors 20 mounted on the front wheels of the vehicle may detect vertical accelerations acting on the front wheels.

Thereafter, the suspension controller 30 may determine the road surface state of the road as the rough road surface state, based on photographed information of the camera 10 and values detected by the wheel acceleration sensors 20 (S202).

For example, the suspension controller 30 may determine the road surface state of the road as the rough road surface state, when a road surface roughness value (RRV) of the road is equal to or greater than the reference value prvF based on the values detected by the wheel acceleration sensors 20.

Thereafter, in the case that the road surface state of the road transmitted from the suspension controller 30 is determined to be the rough road surface state, the mount controller 40 determines whether or not the value detected by the wheel acceleration sensor 20 mounted on the front left wheel or the front right wheel is equal to or greater than the value obtained by multiplying the reference value prvA by the rough road surface weight prvH (S203).

As a result of determination, when the value detected by the wheel acceleration sensor 20 is equal to or greater than the value obtained by multiplying the reference value prvA by the rough road surface weight prvH, the mount controller 40 controls the actuators of the semi-active mounts 50 to enter the off state from the on state so as to enter aftershock control (driving vibration damping control) (S204).

Concretely, when a vertical acceleration acting on the front wheel, i.e., the value detected by the wheel acceleration sensor 20, is equal to or greater than the value obtained by multiplying the reference value prvA by the rough road surface weight prvH, the mount controller 40 determines the road surface state of the road as the rough road surface state requiring aftershock control (driving vibration damping control), and thus controls the actuators of the semi-active mounts 50 to enter the off state from the on state.

Here, the rough road surface weight prvH may be set to 0.8 which is a value to lower the reference value prvA, so as to more easily perform aftershock control (driving vibration damping control) compared to in the general road surface state.

When the actuators of the semi-active mounts 50 are controlled to enter the off state so as to perform aftershock control (driving vibration damping control) depending on the rough road surface state, dynamic stiffness and damping force of the semi-active mounts 50 may be adjusted to equal to or greater than the designated levels in the hopping frequency band which is the main excitation source of road surface vibration, as shown in FIG. 2, and thus, driving vibration damping by the semi-active mounts 50 may be achieved.

Thereafter, the mount controller 40 determines whether or not conditions to control the actuators of the semi-active mounts 50 to return to the on state are satisfied (S205).

That is, after controlling the actuators of the semi-active mounts 50 to enter the off state from the on state, the mount controller 40 determines whether or not the value detected by the wheel acceleration sensor 20 becomes less than the value obtained by multiplying the reference value prvA by the rough road surface weight prvH for the first reference time prvB.

After controlling the actuators of the semi-active mounts 50 to enter the off state from the on state, when the value detected by the wheel acceleration sensor 20 becomes less than the value obtained by multiplying the reference value prvA by the rough road surface weight prvH for the first reference time prvB, the mount controller 40 controls the actuators of the semi-active mounts 50 to return to the on state from the off state (S206).

When the actuators of the semi-active mounts 50 are controlled to return to the on state from the off state, dynamic stiffness of the semi-active mounts 50 may be adjusted to less than the designated low level in the full frequency band, as shown in FIG. 1, and thus, improvement in NVH performance, such as reduction in idle vibration and booming noise transmitted to the interior of the vehicle, may be achieved.

Thereafter, after controlling the actuators of the semi-active mounts 50 to return to the on state from the off state, the mount controller 40 determines whether or not conditions to control the actuators of the semi-active mounts 50 to reenter the off state from the on state are satisfied within the second reference time prvC.

That is, after controlling the actuators of the semi-active mounts 50 to return to the on state from the off state, the mount controller 40 determines whether or not the value detected by the wheel acceleration sensor 20 again becomes equal to or greater than the value obtained by multiplying the reference value prvA by the rough road surface weight prvH within the second reference time prvC which is longer than the first reference time prvB (S207).

After controlling the actuators of the semi-active mounts 50 to return to the on state from the off state, when the value detected by the wheel acceleration sensor 20 again becomes equal to or greater than the value obtained by multiplying the reference value prvA by the rough road surface weight prvH within the second reference time prvC, which is longer than the first reference time prvB, the mount controller 40 controls the actuators of the semi-active mounts 50 to reenter the off state from the on state (S208).

Here, the second reference time prvC may be set to 6 seconds longer than the first reference time prvB so as to suppress frequent reentry of the actuators of the semi-active mounts 50 to the off state from the on state.

When the actuators of the semi-active mounts 50 are controlled to reenter the off state, dynamic stiffness and damping force of the semi-active mounts 50 may be adjusted to equal to or greater than the designated levels in the hopping frequency band which is the main excitation source of road surface vibration, as shown in FIG. 2, and thus, driving vibration damping by the semi-active mounts 50 may be achieved.

Thereafter, after controlling the actuators of the semi-active mounts 50 to reenter the off state from the on state, the mount controller 40 determines whether or not conditions to control the actuators of the semi-active mounts 50 to return again to the on state from the off state are satisfied.

That is, after controlling the actuators of the semi-active mounts 50 to reenter the off state from the on state, the mount controller 40 determines whether or not the value detected by the wheel acceleration sensor 20 becomes less than the value obtained by multiplying the reference value prvA by the rough road surface weight prvH for the third reference value prvB+prvD which is longer than the first reference time prvB but shorter than the second reference time prvC (S209).

After controlling the actuators of the semi-active mounts 50 to reenter the off state from the on state, when the value detected by the wheel acceleration sensor 20 becomes less than the value obtained by multiplying the reference value prvA by the rough road surface weight prvH for the third reference value prvB+prvD which is longer than the first reference time prvB but shorter than the second reference time prvC, the mount controller 40 controls the actuators of the semi-active mounts 50 to return again to the on state from the off state (S210).

In this scenario, reentry of the actuators of the semi-active mounts 50 to the off state from the on state is regarded as a situation in which repeated aftershock control is required, and thus, the third reference value prvB+prvD may be set to 3 seconds, which is longer than the first reference time prvB but shorter than the second reference time prvC.

When the actuators of the semi-active mounts 50 are controlled to return again to the on state from the off state, dynamic stiffness of the semi-active mounts 50 may be adjusted to less than the designated low level in the full frequency band, as shown in FIG. 1, and thus, improvement in NVH performance, such as reduction in idle vibration and booming noise transmitted to the interior of the vehicle, may be achieved.

Hereinafter, a mount control method for vehicles according to yet another embodiment of the present disclosure executed based on the above-described configuration will be described as follows.

Figure 7:
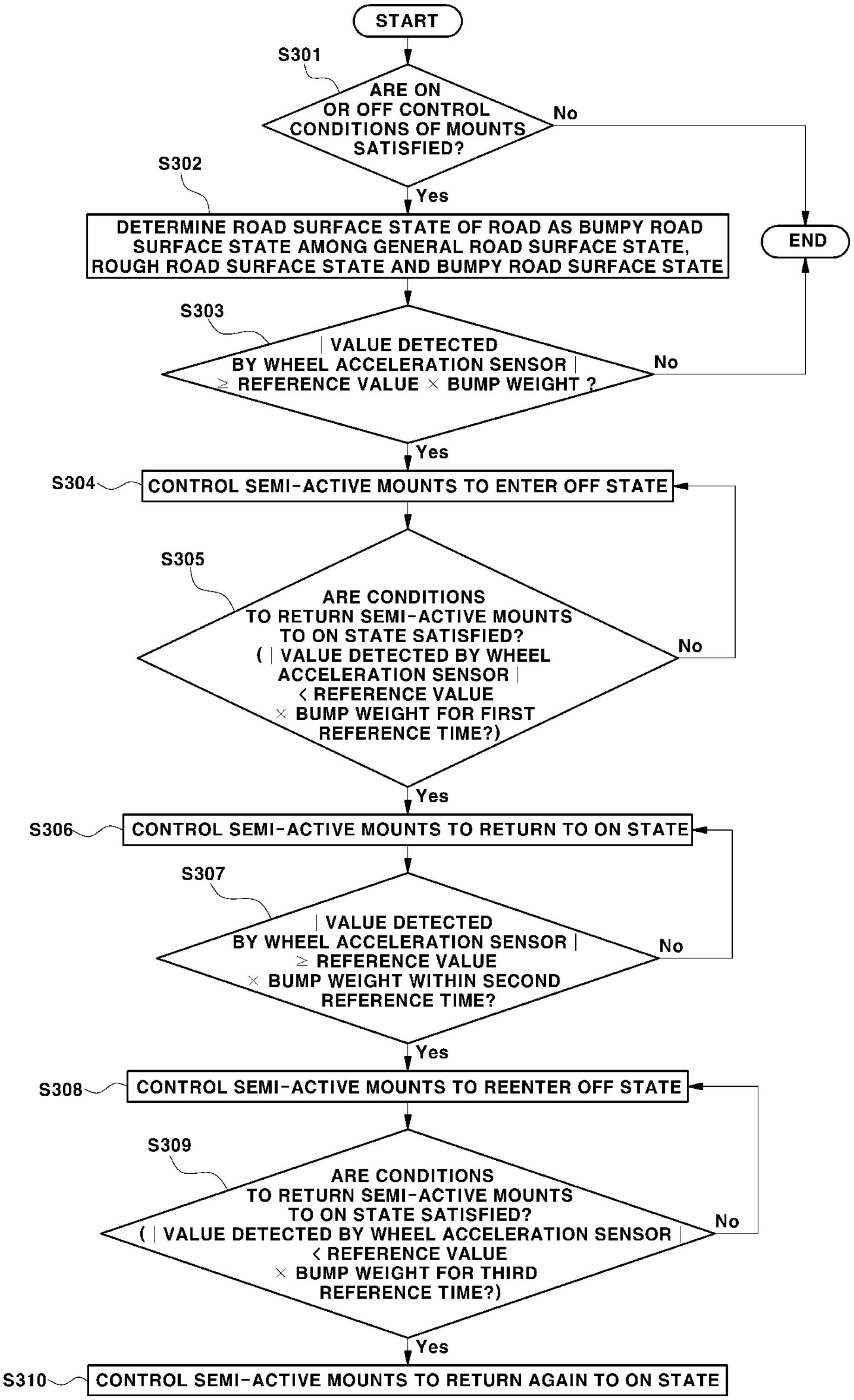
FIG. 7 is a flowchart representing a mount control method for vehicles according to the present disclosure.

FIG. 7 is a flowchart representing the mount control method for vehicles, in a situation in which the road surface state of a road is determined to be the bumpy road surface state.

First, whether or not on or off control conditions of the semi-active mounts 50 are satisfied during driving of the vehicle is determined (S301).

For example, when the suspension controller 30 and the mount controller 40 receive the signal indicating that the rotational speed of the engine is 1200-1600 RPM from the engine controller and the signal indicating that the depressed amount of the accelerator pedal is 10-90% from the accelerator pedal position sensor in the start-up state of the vehicle, it may be determined that conditions to control the actuators of the semi-active mounts 50 to enter the off state from the on state or the on state from the off state are satisfied.

Therefore, upon determining that the on or off control conditions of the semi-active mounts 50 are satisfied, the camera 10 may photograph the road surface condition of the road ahead of the vehicle, and the wheel acceleration sensors 20 mounted on the front wheels of the vehicle may detect vertical accelerations acting on the front wheels.

Thereafter, the suspension controller 30 may determine the road surface state of the road as the bumpy road surface state, based on photographed information of the camera 10 and values detected by the wheel acceleration sensors 20 (S302).

For example, the suspension controller 30 may recognize information about the road surface state of the road determined based on the photographed information (i.e., the road surface condition photographed information) of the camera 10 as a number, and may determine the road surface state of the road as the bumpy road surface state, when the recognition value is equal to or greater than the reference value prvE, for example, 2. Further, the suspension controller 30 may determine the road surface state of the road as the bumpy road surface state, when there is a bump within a set distance (for example, 20 m) ahead of the vehicle or when the vehicle is passing over a bump based on the photographed information of the camera 10.

Thereafter, in the case that the road surface state of the road transmitted from the suspension controller 30 is determined the be the bumpy road surface state, the mount controller 40 determines whether or not the value detected by the wheel acceleration sensor 20 mounted on the front left wheel or the front right wheel is equal to or greater than the value obtained by multiplying the reference value prvA by the bump weight prvL (S303).

As a result of determination, when the value detected by the wheel acceleration sensor 20 is equal to or greater than the value obtained by multiplying the reference value prvA by the bump weight prvL, the mount controller 40 controls the actuators of the semi-active mounts 50 to enter the off state from the on state so as to enter aftershock control (driving vibration damping control) (S304).

Concretely, when a vertical acceleration acting on the front wheel, i.e., the value detected by the wheel acceleration sensor 20, is equal to or greater than the value obtained by multiplying the reference value prvA by the bump weight prvL, the mount controller 40 determines that the road has a bump and requires aftershock control (driving vibration damping control), and thus controls the actuators of the semi-active mounts 50 to enter the off state from the on state.

Here, the bump weight prvL may be set to 0.2 which is a value to significantly lower the reference value prvA, so as to more easily perform aftershock control (driving vibration damping control) compared to in the general road surface state and the rough road surface state.

When the actuators of the semi-active mounts 50 are controlled to enter the off state so as to perform aftershock control (driving vibration damping control) depending on the bumpy road surface state, dynamic stiffness and damping force of the semi-active mounts 50 may be adjusted to equal to or greater than the designated levels in the hopping frequency band which is the main excitation source of road surface vibration, as shown in FIG. 2, and thus, driving vibration damping by the semi-active mounts 50 may be achieved.

Thereafter, the mount controller 40 determines whether or not conditions to control the actuators of the semi-active mounts 50 to return to the on state are satisfied (S305).

That is, after controlling the actuators of the semi-active mounts 50 to enter the off state from the on state, the mount controller 40 determines whether or not the value detected by the wheel acceleration sensor 20 becomes less than the value obtained by multiplying the reference value prvA by the bump weight prvL for the first reference time prvB.

After controlling the actuators of the semi-active mounts 50 to enter the off state from the on state, when the value detected by the wheel acceleration sensor 20 becomes less than the value obtained by multiplying the reference value prvA by the bump weight prvL for the first reference time prvB, the mount controller 40 controls the actuators of the semi-active mounts 50 to return to the on state from the off state (S306).

When the actuators of the semi-active mounts 50 are controlled to return to the on state from the off state, dynamic stiffness of the semi-active mounts 50 may be adjusted to less than the designated low level in the full frequency band, as shown in FIG. 1, and thus, improvement in NVH performance, such as reduction in idle vibration and booming noise transmitted to the interior of the vehicle, may be achieved.

Thereafter, after controlling the actuators of the semi-active mounts 50 to return to the on state from the off state, the mount controller 40 determines whether or not conditions to control the actuators of the semi-active mounts 50 to reenter the off state from the on state are satisfied within the second reference time prvC.

That is, after controlling the actuators of the semi-active mounts 50 to return to the on state from the off state, the mount controller 40 determines whether or not the value detected by the wheel acceleration sensor 20 again becomes equal to or greater than the value obtained by multiplying the reference value prvA by the bump weight prvL within the second reference time prvC which is longer than the first reference time prvB (S307).

After controlling the actuators of the semi-active mounts 50 to return to the on state from the off state, when the value detected by the wheel acceleration sensor 20 again becomes equal to or greater than the value obtained by multiplying the reference value prvA by the bump weight prvL within the second reference time prvC which is longer than the first reference time prvB, the mount controller 40 controls the actuators of the semi-active mounts 50 to reenter the off state from the on state (S308).

Here, the second reference time prvC may be set to 6 seconds longer than the first reference time prvB so as to suppress frequent reentry of the actuators of the semi-active mounts 50 to the off state from the on state.

When the actuators of the semi-active mounts 50 are controlled to reenter the off state on the road having the bump, dynamic stiffness and damping force of the semi-active mounts 50 may be adjusted to equal to or greater than the designated levels in the hopping frequency band which is the main excitation source of road surface vibration, as shown in FIG. 2, and thus, driving vibration damping by the semi-active mounts 50 may be achieved.

Thereafter, after controlling the actuators of the semi-active mounts 50 to reenter the off state from the on state, the mount controller 40 determines whether or not conditions to control the actuators of the semi-active mounts 50 to return again to the on state from the off state are satisfied.

That is, after controlling the actuators of the semi-active mounts 50 to reenter the off state from the on state, the mount controller 40 determines whether or not the value detected by the wheel acceleration sensor 20 becomes less than the value obtained by multiplying the reference value prvA by the bump weight prvL for the third reference value prvB+prvD which is longer than the first reference time prvB but shorter than the second reference time prvC (S309).

After controlling the actuators of the semi-active mounts 50 to reenter the off state from the on state, when the value detected by the wheel acceleration sensor 20 becomes less than the value obtained by multiplying the reference value prvA by the bump weight prvL for the third reference value prvB+prvD which is longer than the first reference time prvB but shorter than the second reference time prvC, the mount controller 40 controls the actuators of the semi-active mounts 50 to return again to the on state from the off state (S310).

Here, reentry of the actuators of the semi-active mounts 50 to the off state from the on state is regarded as a situation in which repeated aftershock control is required, and thus, the third reference value prvB+prvD may be set to 3 seconds, which is longer than the first reference time prvB but shorter than the second reference time prvC.

When the actuators of the semi-active mounts 50 are controlled to return again to the on state from the off state, dynamic stiffness of the semi-active mounts 50 may be adjusted to less than the designated low level in the full frequency band, as shown in FIG. 1, and thus, improvement in NVH performance, such as reduction in idle vibration and booming noise transmitted to the interior of the vehicle, may be achieved.

Figure 8:
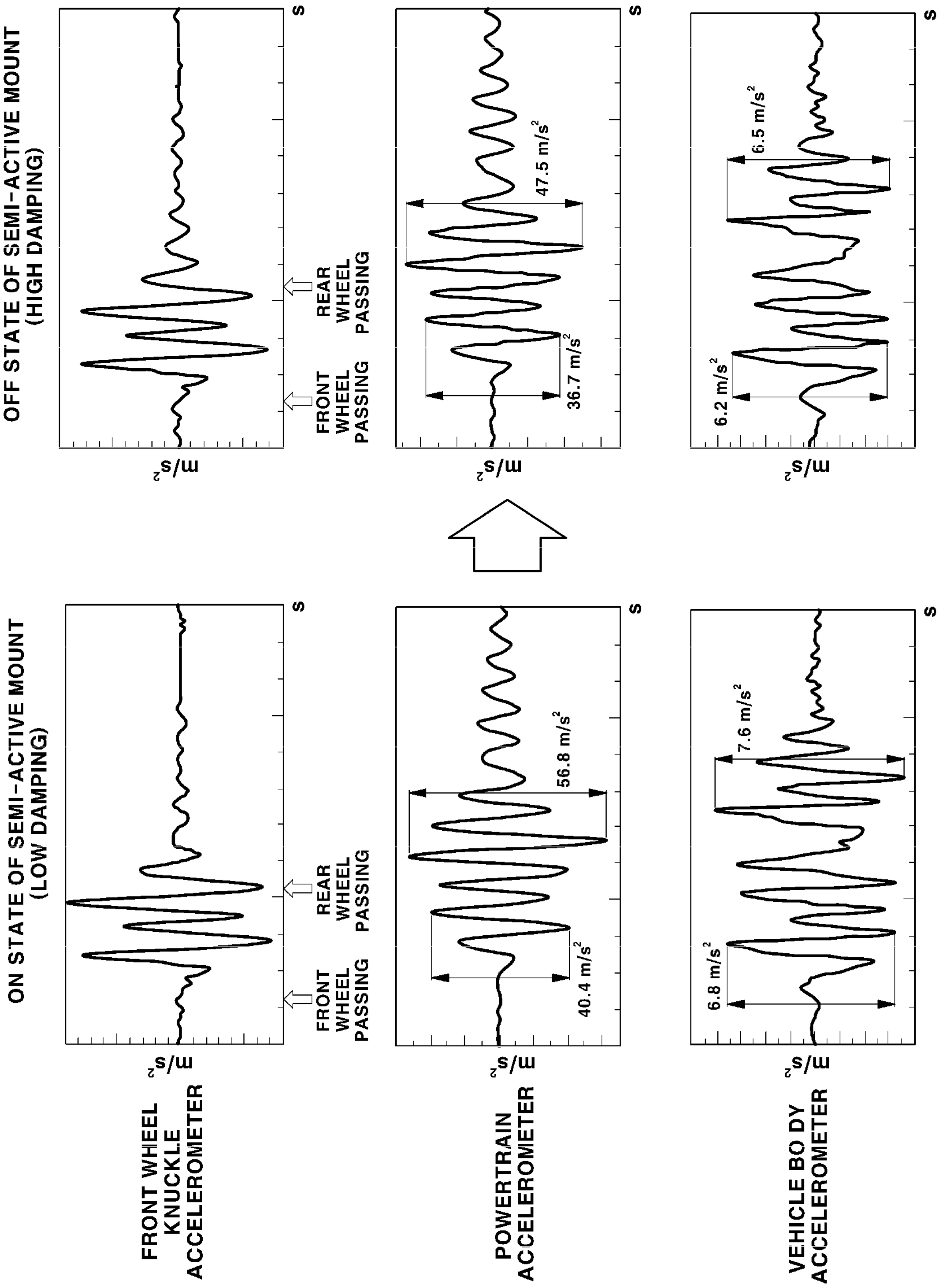
FIG. 8 shows test result graphs representing improvement in vertical vibration of a vehicle body, when semi-active mounts are controlled to enter the off state from the on state based on the mount control system and method according to the present disclosure.

As one test example of the mount control system according to the present disclosure, the acceleration of a front wheel knuckle, the acceleration of a powertrain, and the acceleration of a vehicle body were measured when the vehicle in the on state of the semi-active mounts passes through a bumpy road during driving, and measurement results are shown in the left graphs in FIG. 8, and the acceleration of the front wheel knuckle, the acceleration of the powertrain, and the acceleration of the vehicle body were measured when the vehicle in the off state of the semi-active mounts passes through the bumpy road during driving, and measurement results are shown in the right graphs in FIG. 8.

As shown in FIG. 8, it may be confirmed that driving vibration of the vehicle including vertical vibration of the engine was improved by 10-20% or greater when the vehicle in the off state of the semi-active mounts passes through the road having the bump, compared to when the vehicle in the on state of the semi-active mounts passes through the bumpy road.

Figure 9:
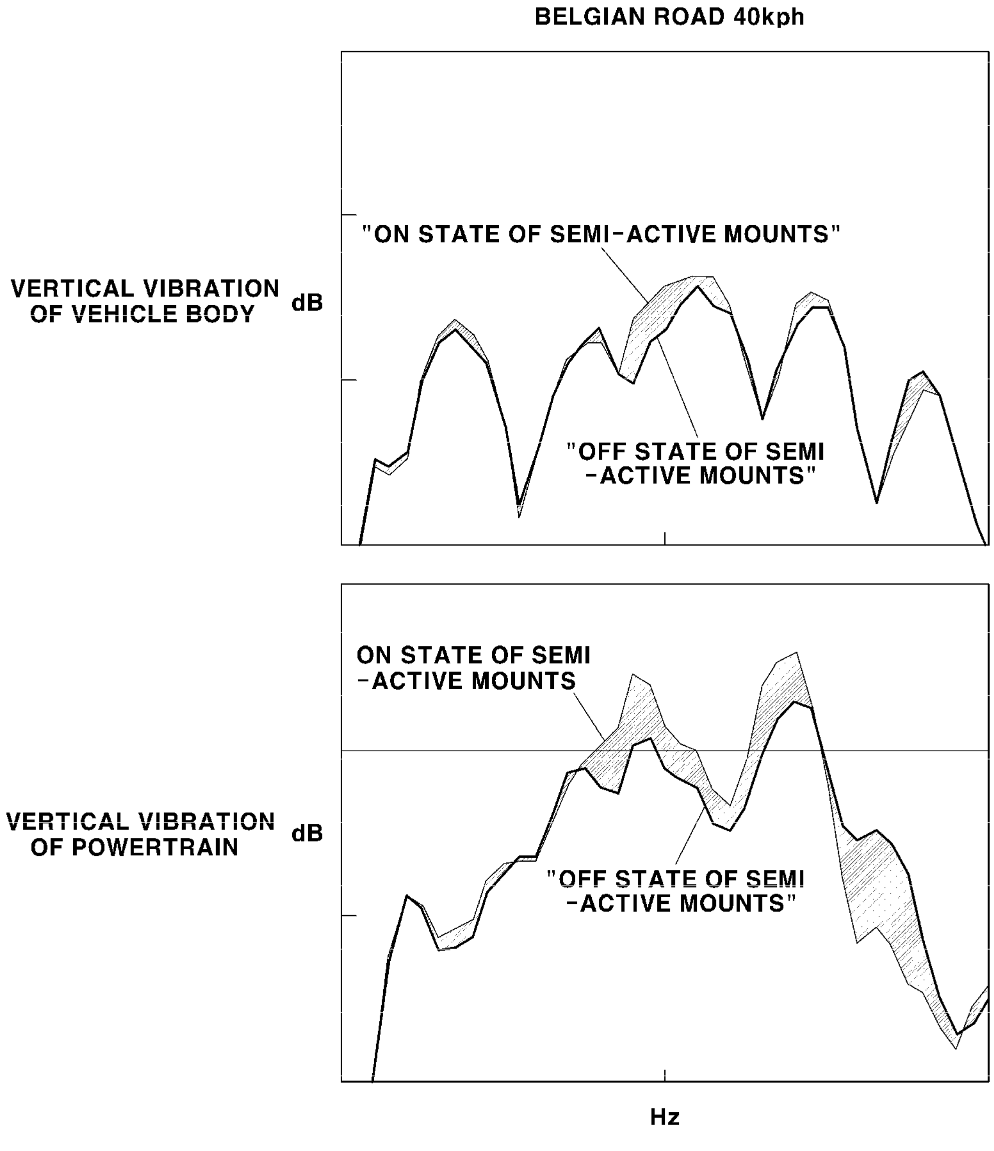
FIG. 9 shows test result graphs representing improvement in vertical vibration of the vehicle body and a powertrain, when the semi-active mounts are controlled to enter the off state from the on state during driving of the vehicle on a Belgian road based on the mount control system and method according to the present disclosure.

Further, as another test example of the mount control system according to the present disclosure, it may be confirmed that, when the vehicle passes through a Belgian road paved with a large number of cobblestone blocks, driving vibration of the vehicle including vertical vibration of the vehicle body and vertical vibration of the powertrain in the off state of the semi-active mounts was improved by about 1.2 dB, compared to in the on state of the semi-active mounts, as shown in FIG. 9.

Figure 10:
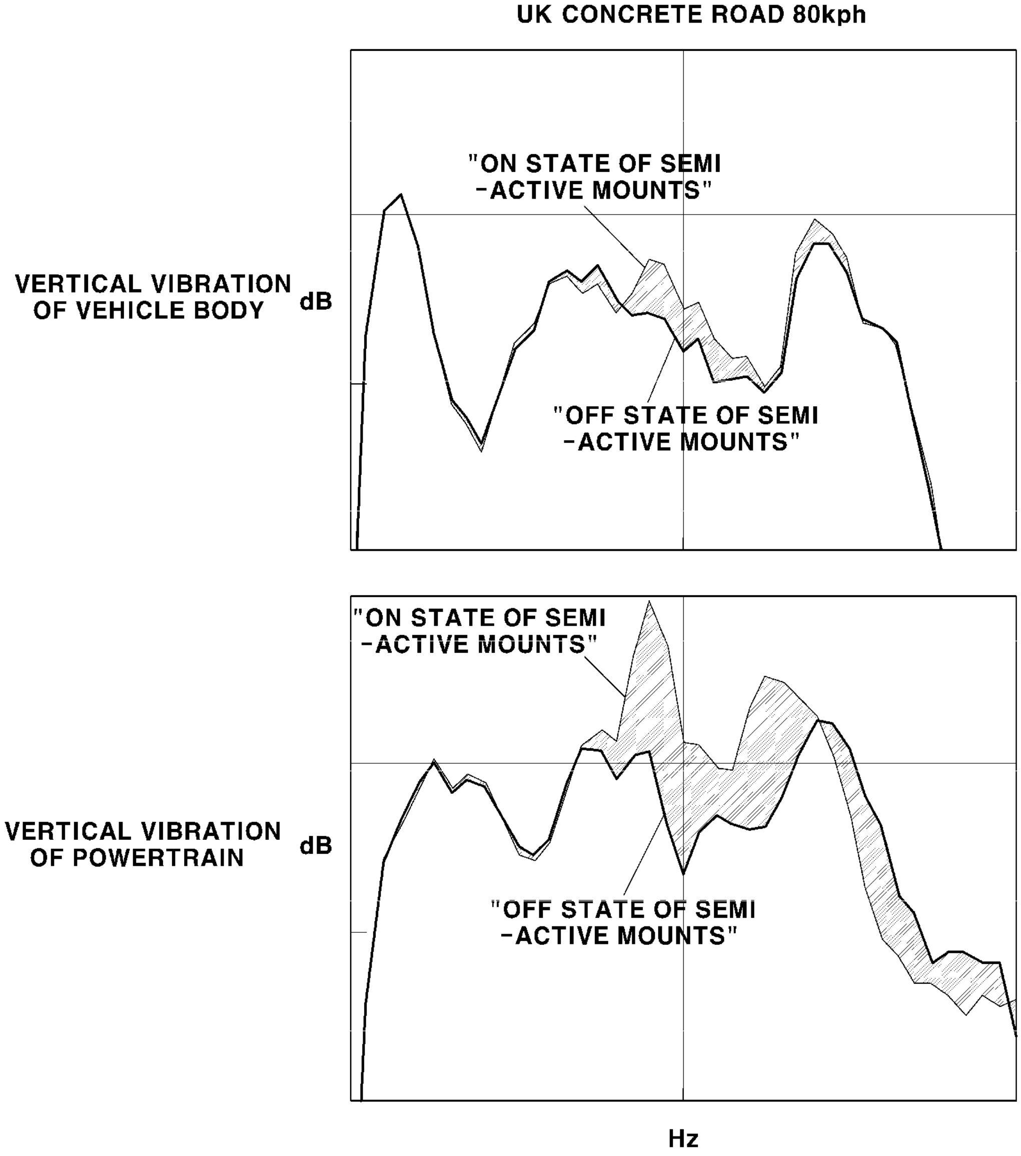
FIG. 10 shows test result graphs representing improvement in vertical vibration of the vehicle body and the powertrain, when the semi-active mounts are controlled to enter the off state from the on state during driving of the vehicle on a concrete road based on the mount control system and method according to the present disclosure.

Further, as yet another test example of the mount control system according to the present disclosure, it may be confirmed that, when the vehicle passes through a concrete road which is a kind of rough road, driving vibration of the vehicle including vertical vibration of the vehicle body and vertical vibration of the powertrain in the off state of the semi-active mounts was improved by about 1.2 dB, compared to in the on state of the semi-active mounts, as shown in FIG. 10.

As is apparent from the above description, a mount control system and method for vehicles according to the present disclosure provide the following effects.

First, when a mount controller controls actuators of semi-active mounts so as to be maintained in the on state based on road surface state information of a road ahead of a vehicle determined by a suspension controller and values detected by wheel acceleration sensors mounted on respective wheels, dynamic stiffness of the semi-active mounts may be adjusted to less than a designated low level, and thus, improvement in NVH performance, such as reduction in idle vibration and booming noise, may be achieved.

Second, when the mount controller controls the actuators of the semi-active mounts so as to enter the off state from the on state based on the road surface state information of the road ahead of the vehicle determined by the suspension controller and the values detected by the wheel acceleration sensors mounted on the respective wheels, dynamic stiffness and damping force of the semi-active mounts may be adjusted to equal to or greater than designated levels, and thus, driving vibration damping performance by the semi-active mounts depending on the road surface state may be improved.

Third, through cooperative control between the suspension controller of an electronically controlled suspension system with road preview and the mount controller configured to control turning-on/off of the actuators of the semi-active mounts, both improvement in NVH performance of the semi-active mounts and improvement in driving vibration damping performance depending on the road surface state may be achieved together.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A mount control system for vehicles, comprising:

a camera mounted on the front part of a vehicle;

a plurality of wheel acceleration sensors mounted on front wheels of the vehicle;

a suspension controller configured to determine a road surface state of the road based on photographing information in which the camera photographs the road surface conditions on the road ahead and vertical acceleration value acting on the front wheels detected by the wheel acceleration sensors; and a mount controller configured to control an actuator of semi-active mounts to be driven or not driven based on road surface state determination information transmitted from the suspension controller and the values detected by the plurality of wheel acceleration sensors, the semi-active mounts are driven or not driven by the mount controller, based on road surface state determination information and the values detected by the plurality of wheel acceleration sensors, wherein the suspension controller determines the road surface state of the road as one of a general road surface state, a rough road surface state and a bumpy road surface state, and the suspension controller determines the road surface state of the road as the general road surface state when a road surface roughness value of the road is less than a reference value, and determines the road surface state of the road as the rough road surface state when the road surface roughness value of the road is equal to or greater than another reference value, wherein the suspension controller determines the road surface state of the road as the bumpy road surface state when there is a bump within a set distance ahead of the vehicle or when the vehicle is passing over a bump, the road surface roughness value is an index value calculated by integrating the values detected by the wheel acceleration sensors, wherein, in a case in which the road surface state of the road transmitted from the suspension controller is determined to be the general road surface state, the mount controller controls the actuator of the semi-active mounts to enter the off state from the on state, when the value detected by the wheel acceleration sensor mounted on one of the front wheels is equal to or greater than a yet another reference value, wherein, in a case in which the road surface state of the road transmitted from the suspension controller is determined to be the rough road surface state, the mount controller controls the actuator of the semi-active mounts to enter the off state from the on state, when the value detected by the wheel acceleration sensor mounted on one of the front wheels is equal to or greater than a value obtained by multiplying a yet another reference value by a rough road surface weight, wherein, in a case in which the road surface state of the road transmitted from the suspension controller is determined to be the bumpy road surface state, the mount controller controls the actuator of the semi-active mounts to enter the off state from the on state, when the value detected by the wheel acceleration sensor mounted on one of the front wheels is equal to or greater than a value obtained by multiplying a yet another reference value by a bump weight.

2. The mount control system of claim 1, wherein, after controlling the actuator of the semi-active mounts to enter the off state from the on state, the mount controller controls the semi-active mounts to return to the on state from the off state, when the value detected by the wheel acceleration sensor becomes less than the reference value for a first reference time.

3. The mount control system of claim 2, wherein, after controlling the actuator of the semi-active mounts to return to the on state from the off state, the mount controller controls the actuator of the semi-active mounts to reenter the off state from the on state, when the value detected by the wheel acceleration sensor again becomes equal to or greater than the reference value within a second reference time longer than the first reference time.

4. The mount control system of claim 3, wherein, after controlling the actuators of the semi-active mounts to reenter the off state from the on state, the mount controller controls the actuator of the semi-active mounts to return again to the on state from the off state, when the value detected by the wheel acceleration sensor becomes less than the reference value for a third reference value longer than the first reference time but shorter than the second reference time.

5. The mount control system of claim 1, wherein, after controlling the actuator of the semi-active mounts to enter the off state from the on state, the mount controller controls the actuator of the semi-active mounts to return to the on state from the off state, when the value detected by the wheel acceleration sensor becomes less than the value obtained by multiplying the reference value by the rough road surface weight for a first reference time.

6. The mount control system of claim 5, wherein, after controlling the actuator of the semi-active mounts to return to the on state from the off state, the mount controller controls the actuator of the semi-active mounts to reenter the off state from the on state, when the value detected by the wheel acceleration sensor again becomes equal to or greater than the value obtained by multiplying the reference value by the rough road surface weight within a second reference time longer than the first reference time.

7. The mount control system of claim 6, wherein, after controlling the actuators of the semi-active mounts to reenter the off state from the on state, the mount controller controls the actuator of the semi-active mounts to return again to the on state from the off state, when the value detected by the wheel acceleration sensor becomes less than the value obtained by multiplying the reference value by the rough road surface weight for a third reference value longer than the first reference time but shorter than the second reference time.

8. The mount control system of claim 1, wherein, after controlling the actuator of the semi-active mounts to enter the off state from the on state, the mount controller controls the actuator of the semi-active mounts to return to the on state from the off state, when the value detected by the wheel acceleration sensor becomes less than the value obtained by multiplying the reference value by the bump weight for a first reference time.

9. The mount control system of claim 8, wherein, after controlling the actuator of the semi-active mounts to return to the on state from the off state, the mount controller controls the actuator of the semi-active mounts to reenter the off state from the on state, when the value detected by the wheel acceleration sensor again becomes equal to or greater than the value obtained by multiplying the reference value by the bump weight within a second reference time longer than the first reference time.

10. The mount control system of claim 9, wherein, after controlling the actuators of the semi-active mounts to reenter the off state from the on state, the mount controller controls the actuator of the semi-active mounts to return again to the on state from the off state, when the value detected by the wheel acceleration sensor becomes less than the value obtained by multiplying the reference value by the bump weight for a third reference value longer than the first reference time but shorter than the second reference time.

11. A mount control method for vehicles, comprising:

photographing, by a camera, a road surface condition of a road ahead of a vehicle;

detecting, by wheel acceleration sensors mounted on front wheels of the vehicle, vertical accelerations acting on the front wheels;

determining, by a suspension controller, a road surface state of the road based on photographed information of the camera and values detected by the wheel acceleration sensors; and controlling, by a mount controller, an actuator of semi-active mounts to be driven or not driven based on road surface state determination information transmitted from the suspension controller and the values detected by the wheel acceleration sensors, the semi-active mounts are driven or not driven by the mount controller, based on road surface state determination information and the values detected by the plurality of wheel acceleration sensors, wherein, when the road surface state of the road is determined to be one of a general road surface state, a rough road surface state and a bumpy road surface state by the suspension controller, the road surface state of the road is determined to be the general road surface state when a road surface roughness value of the road is less than a reference value, is determined to be the rough road surface state when the road surface roughness value of the road is equal to or greater than another reference value, and is determined to be the bumpy road surface state when there is a bump within a set distance ahead of the vehicle or when the vehicle is passing over a bump, the road surface roughness value is an index value calculated by integrating the values detected by the wheel acceleration sensors, wherein when the road surface state of the road transmitted from the suspension controller is determined to be the general road surface state, the actuator of the semi-active mounts are controlled to enter the off state from the on state by the mount controller, when the value detected by the wheel acceleration sensor mounted on one of the front wheels is equal to or greater than a yet another reference value, wherein when the road surface state of the road transmitted from the suspension controller is determined to be the general road surface state, the actuator of the semi-active mounts are controlled to enter the off state from the on state by the mount controller, when the value detected by the wheel acceleration sensor mounted on one of the front wheels is equal to or greater than a value obtained by multiplying a yet another reference value by a rough road surface weight, wherein when the road surface state of the road transmitted from the suspension controller is determined to be the general road surface state, the actuator of the semi-active mounts are controlled to enter the off state from the on state by the mount controller, when the value detected by the wheel acceleration sensor mounted on one of the front wheels is equal to or greater than a value obtained by multiplying a yet another reference value by a bump weight.

* * * * *